United States Patent
Orain et al.

[11] Patent Number: 6,120,381
[45] Date of Patent: Sep. 19, 2000

[54] SLIDING CONSTANT-VELOCITY JOINT, PARTICULARLY FOR LONGITUDE DRIVES

[76] Inventors: Michel Orain, deceased, late of Conflans-Sainte-Honorine; by Ginette Fernande (Deschamps) Orain, legal representative; by Aline Marie Orain, legal representative, both of 50 rue de l'Yvette, 91430 Igny; by Philippe Yves Daniel Orain, legal representative, 7, rue Alfred de Vigny, 91400 Savigny-sur-Orge; by Martine Evelyne Genevieve (Orain) Conte, legal representative, 32 Boulevard de la Terrasse, 91400 Orsay, all of France

[21] Appl. No.: 09/266,149

[22] Filed: Mar. 10, 1999

[30] Foreign Application Priority Data

Mar. 16, 1998 [FR] France ................................. 98 03196

[51] Int. Cl.$^7$ ........................................................ F16D 3/16
[52] U.S. Cl. ........................... 464/123; 464/905; 464/162
[58] Field of Search ...................................... 464/106, 112, 464/120, 122, 123, 124, 127, 132, 136, 147, 162, 167, 905

[56] References Cited

U.S. PATENT DOCUMENTS

| | | |
|---|---|---|
| 2,685,784 | 8/1954 | Wildhaber . |
| 2,691,876 | 10/1954 | Wildhaber . |
| 2,752,765 | 7/1956 | Wildhaber .............................. 464/11 |
| 2,777,306 | 1/1957 | Wildhaber . |
| 2,802,352 | 8/1957 | Anderson ............................. 464/124 |

FOREIGN PATENT DOCUMENTS 2579700   10/1986   France .

*Primary Examiner*—Lynne A. Browne
*Assistant Examiner*—Kenn Thompson
*Attorney, Agent, or Firm*—Marshall & Melhorn

[57] ABSTRACT

The inner peripheral wall of the sleeve has four longitudinal grooves each disposed between two adjacent races. The driver has the form of a cross with four arms disposed radially at right angles to one another and each serving as a pivot shaft for a corresponding equalizing lever. Each bipod has four radial lugs disposed at 45° to the axis of the rollers carried by said bipod, and each lug has on its surface facing the driver a slot designed to receive an associated end of the corresponding equalizing lever.

10 Claims, 4 Drawing Sheets

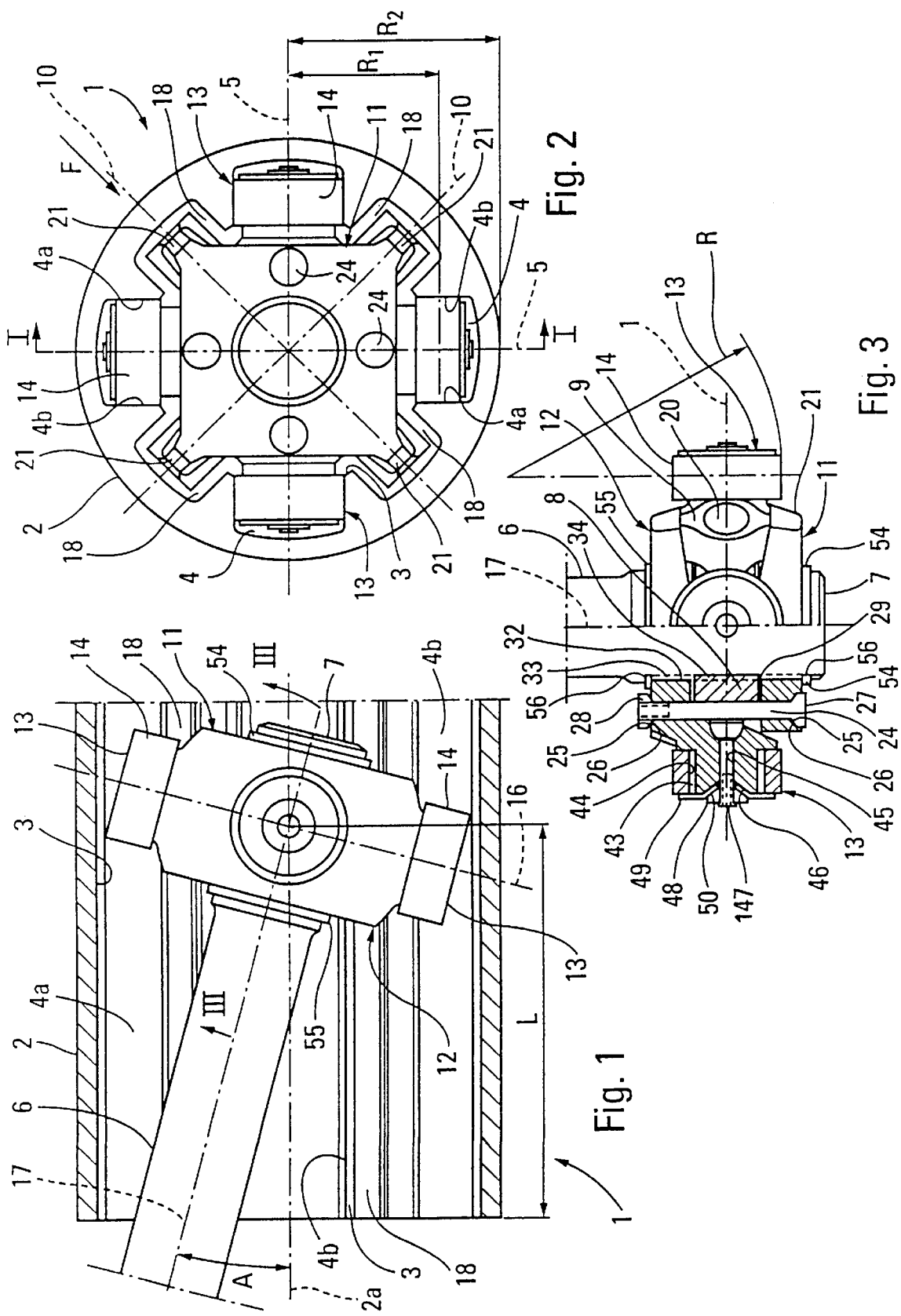

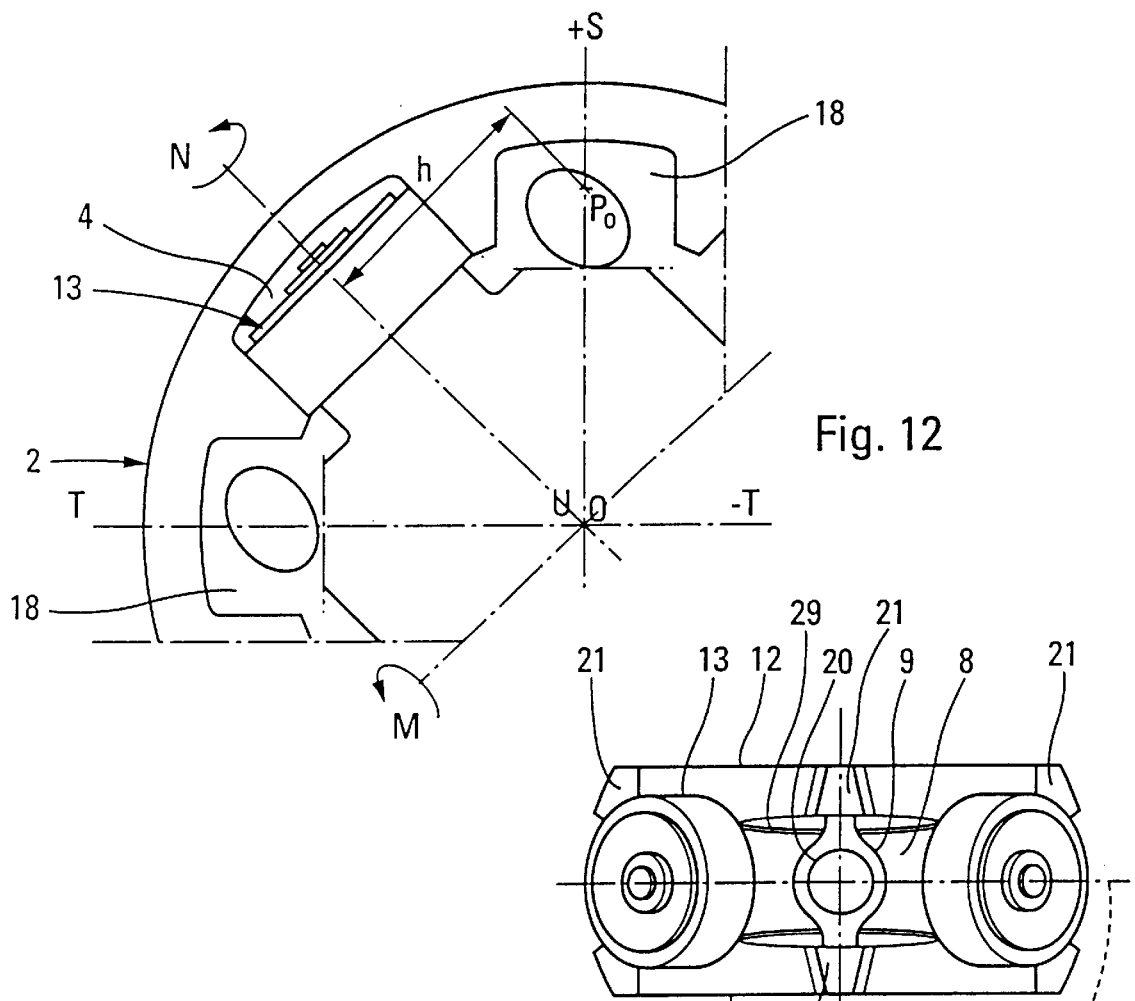
Fig. 12
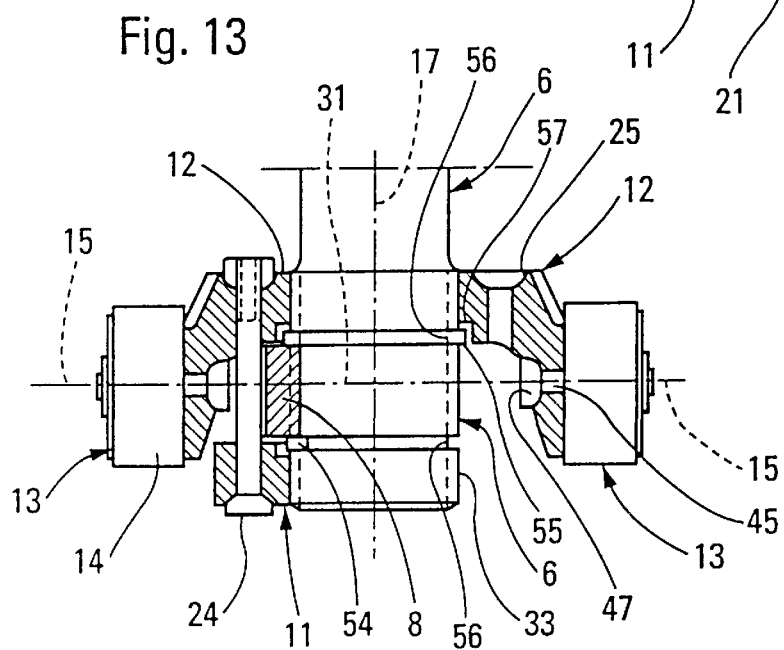
Fig. 13
Fig. 7

SLIDING CONSTANT-VELOCITY JOINT, PARTICULARLY FOR LONGITUDE DRIVES

BACKGROUND OF THE INVENTION

1. Field of the Invention

The present invention pertains to a sliding constant-velocity joint, particularly for longitudinal drives of motor vehicles.

2. Description of the Prior Art

Generally, the shafts of longitudinal drives for motor vehicles have a Cardan joint at each end and a telescoping device with sliding splines that adapts to changes in the distance between the connected mechanical members.

Although this solution is very widely used, it imposes severe technical limitations on vehicle designers as a result of these shortcomings of its components:

1) the velocity variations of the Cardan joints limit the maximum working angle to between 5 and 10°, depending on the rotative speed;
2) the axial resistance to compression/elongation movements is high and essentially proportional to the transmitted torque, resulting in large axial reactions on the connected mechanical members.

To overcome these limitations, solutions have been proposed based on sliding constant-velocity joints, which have provided satisfactory power transmission in the transverse drives of front-wheel drive vehicles.

However, longitudinal drives require constant-velocity joints with higher performance, particularly:

a) the ability to operate at a continuous angle at greater speed, for example at a speed about three times greater, and thus the ability to transmit triple the power at the same torque;
b) the ability to adjust to a much larger angle: in contrast to the splined telescoping system, the insertion of which is independent of the angle of the Cardan joints and thus is theoretically unlimited, the insertion of a sliding constant-velocity joint is limited due to the obvious geometric reasons of conical deflection of the shaft inside the bowl.

The proposed solutions have shown their limitations, which can be summarized as follows:

1. For ball-type joints: heat removal and wear, as well as insufficient angular adjustment, which limits their use to applications with a continuous working angle of about 4°;
2. For tripod joints: radial vibrations at high speed and insufficient angular adjustment;
3. For solutions with a radially centered double Cardan joint with sliding splines: high cost and bulkiness, as well as the large axial reactions generated by the sliding splines;
4. For solutions with four rollers: insufficient angular adjustment for a given outside diameter, for example, of the joint described in FR-A-2,566,858, which limits this solution to applications with little or no adjustment.

Disclosed in U.S. Pat. No. 2,691,876 is a sliding constant-velocity joint comprising:

an outer member or sleeve having on the inner peripheral wall four identical longitudinal races, each having two tracks parallel to the axis of said sleeve, the races being open inwardly and each having a radial symmetry plane at a right angle to the radial symmetry plane of the adjacent races;

an inner input shaft carrying in the vicinity of its end a driving member that is attached to said shaft and that has on its periphery several equalizing levers, each designed to pivot in relation to the driver about a respective radial axis, said equalizing levers being evenly spaced on the periphery of said driver;

two bipods mounted in a pivoting manner about the inner shaft on either side of the driver, each bipod having at each of its two opposite radial ends a respective roller having a peripheral bearing surface with a profile complementary to that of the corresponding race to allow it to roll in relation to said race, the axes of the four rollers being in the same plane perpendicular to the axis of the internal shaft;

the equalizing levers being arranged so that the two bipods are always pivoted at the same angle in opposite directions in relation to the driver.

It follows from a study of this document that each equalizing lever has a central portion with a cylindrical outer contour seated in a peripheral slot, having a complementary inner cylindrical contour and a radial axis, arranged on the periphery of the driver, and that the inner surfaces of the two bipods contact the corresponding surfaces of the driver and pivot in relation to said corresponding surfaces.

What obtains then is a sliding constant-velocity joint consisting of two bipod joints that are inherently not of constant velocity and that are paired in such a manner that the departure from constant velocity of the first bipod is at every instant algebraically added to the departure from constant velocity of the second bipod. Because the axes of the rollers of the two bipods are on average perpendicular, the departures from constant velocity at every instant are of the same absolute value and in the opposite directions, and the sum of these is thus always zero.

However, in this joint, the maximum working angle and the maximum possible insertion for a given working angle are too small for most present applications, which require a double Cardan joint with a swivel and sliding splines.

In addition, the surfaces for torque transfer between the bipods and the shaft are much too small and are poorly situated inside the joint. Thus the lever arm is short and the lubrication is too precarious to ensure a sufficient capacity. Finally, the axial stacking of the principal parts causes complementary moments that result in excessive friction, mechanical losses, and wear that are incompatible with high-speed applications.

SUMMARY OF THE INVENTION

The object to the present invention is to eliminate the shortcomings of the disclosed devices and to propose a sliding constant-velocity joint of the type cited above that is capable of replacing Cardan sliding-spline systems in many applications at a lower cost and with less bulk, while permitting continuous working angles that are two to three times greater and with a high mechanical efficiency, ensuring complete freedom of insertion or elongation under torque, and providing a simple, robust, and reliable structure while offering a lower cost and less bulk than the disclosed joints.

According to the invention, the sliding constant-velocity joint of the type cited above is characterized in that:

the sleeve has on its inner peripheral wall four longitudinal recess grooves open inwardly, each groove being arranged along the diagonal between the two adjacent races;

the driver has the form of a cross with four arms arranged radially at right angles to one another, the free end of each arm being shaped so that it can serve as the pivot for a corresponding equalizing lever;

each bipod has four radial lugs arranged at right angles to one another and at 45° to the axis of the rollers mounted on said bipod, and each lug has on the surface facing the driver a slot designed to receive an associated end of the corresponding equalizing lever;

the recess grooves are dimensioned to let the bipod lugs and the equalizing levers pass without contact;

means are provided to press the two bipods continually onto the ends of the equalizing levers, which are arranged so as to keep the inner surface of each bipod at a distance from the cross at all times in order to avoid any contact between either bipod and the cross.

Thus each equalizing lever pivots in a very simple and reliable manner about the corresponding arm of the cross-shaped driver, while each end of the equalizing lever can also move in a pivoting manner in the associated slot of the corresponding bipod to allow said bipod to pivot about the inner shaft of the sliding constant-velocity joint according to the invention.

To keep the bipods at a distance from the cross-shaped driver, the equalizing levers are substantially longer than those of the prior art described above, so that by a simple lever-arm effect, the same pivot angle of the equalizing lever permits a substantially larger relative displacement of one bipod in relation to the other. Furthermore, the structure of the joint according to the invention permits each equalizing lever to have a much larger pivot angle than is the case with the equalizing levers of prior joints.

Thus the present invention proposes a sliding constant-velocity joint capable of better performance as mentioned above in comparison with the joints according to the prior art.

In addition, the rollers are mounted in opposing pairs on two perpendicular axes and two perpendicular symmetry planes. The axial reactions on the shaft are thus totally suppressed when the joint is rotating at an angle and under torque. The result is an appreciable improvement in comfort.

Consequently, the sliding constant-velocity joint according to the present invention also is capable, in a second major application, of advantageously replacing the classic sliding constant-velocity joints in the transverse drives of front-wheel drive vehicles when, for reasons of comfort, the axial reactions must be exactly neutralized and the continuous working angle is greater than or equal to 10°.

Other characteristics and advantages of the present invention will be apparent from the detailed description that follows.

BRIEF DESCRIPTION OF THE DRAWINGS

In the attached drawings, which are given only as non-limiting examples:

FIG. 1 is an elevation, with a partial axial section along I—I of FIG. 2, of a sliding constant- velocity joint according to one embodiment of the invention, the inner shaft being pivoted at a mean angle A of 15° to the longitudinal axis of the outer member.

FIG. 2 is an end view of the joint of FIG. 1, the inner/shaft being in the aligned position with its axis coinciding with that of the outer member.

FIG.3 shows the inner shaft in a partial elevation and a partial axial cross section along III—III of FIG. 1.

FIG. 7 is an elevation of the assembly formed by the driver and the two bipods viewed in the direction of the arrow F of FIG. 2.

FIG. 12 is a diagram showing the locus of the point P situated at the corner of a lug of a bipod during the operation of the joint according to the embodiment of FIGS. 1 through 3.

FIG. 13 is an axial cross section showing another embodiment of the inner shaft of the joint according to the present invention.

DESCRIPTION OF THE PREFERRED EMBODIMENT

Figures 4, 5, 6:
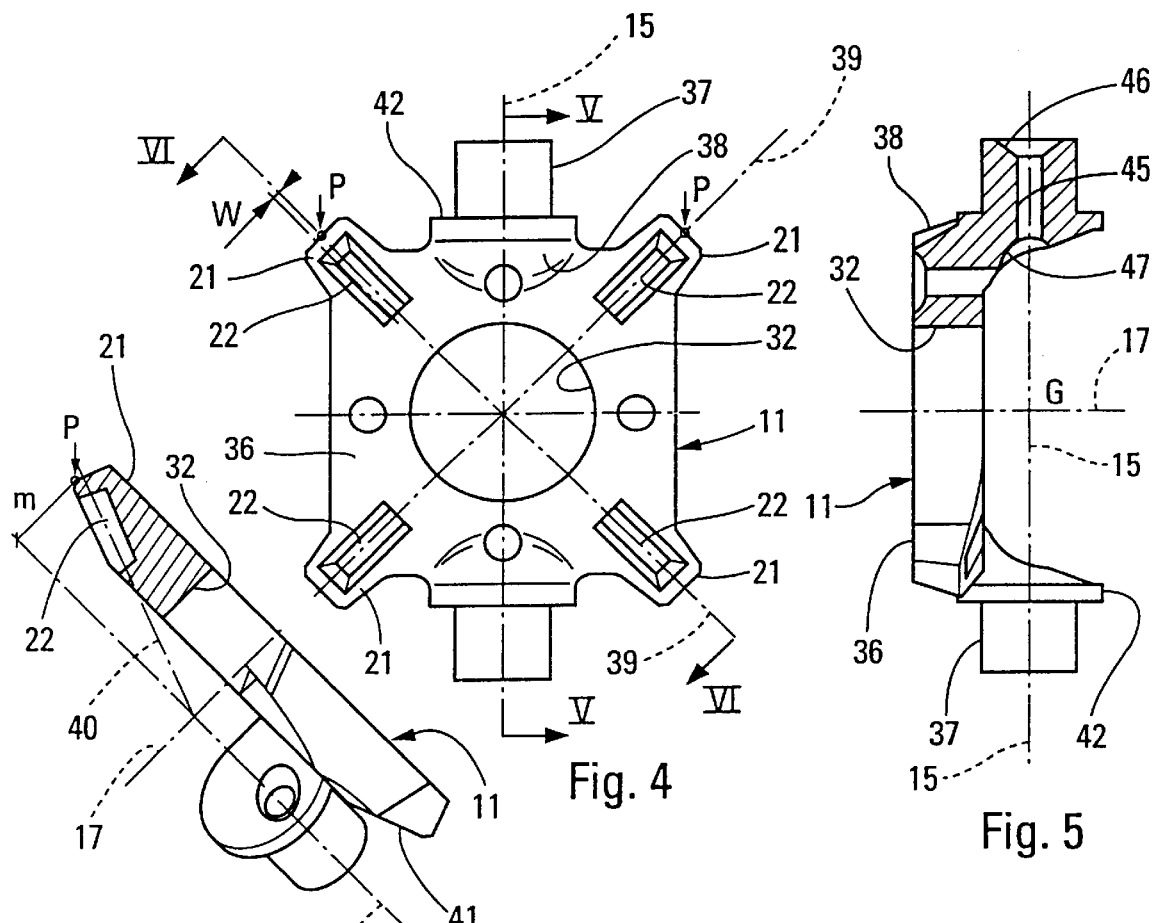
FIG. 4 is a plan view of a bipod of the joint of FIG. 1.
FIG. 5 is a cross section along V—V of FIG. 4.
FIG. 6 is a cross section along VI—VI of FIG. 4.

In the embodiment shown in FIGS. 1 through 3, the sliding constant-velocity joint 1 comprises:

an outer member or sleeve 2 having an inner peripheral wall 3 with four identical longitudinal races 4, each comprising two tracks 4a and 4b parallel to the axis 2a of the sleeve 2, the races 4 being open inwardly and each having a radial symmetry plane 5 at right angles to the radial symmetry plane 5 of the adjacent races 4;

an inner input shaft 6 with a driving member 8 mounted in the vicinity of the end 7 of said shaft 6 and fixed thereto, said driving member having on its periphery several equalizing levers 9 designed so that each pivots in relation to the driver 8 about a respective radial axis 10 at right angles to the axes 10 of the adjacent equalizing levers 9;

two bipods 11 and 12 mounted to pivot about the inner shaft 6 on either side of the driver 8, each bipod 11 and 12 having at each of its two opposite radial ends a respective roller 13 having a peripheral bearing surface 14 with a profile complementary to that of the corresponding race 4 to allow it to roll in relation to said race 4, the axes 15 of the rollers 13 being in the same plane 16 perpendicular to the axis 17 of the inner shaft 6;

the equalizing levers 9 being arranged so that the two bipods 11 and 12 in relation to the driver 8 are always in respective pivoted positions corresponding to the same pivot angle in opposite directions.

According to the invention, the sliding constant-velocity joint 1 is characterized in that:

the inner peripheral wall 3 of the sleeve 2 has four longitudinal recess grooves 18 that open inwardly and are each disposed on a diagonal between two adjacent races 4;

the driver 8 is in the form of a cross with four arms 19 disposed radially at right angles to one another, the free end of each arm being configured to serve as the pivot shaft 20 of a corresponding equalizing lever 9;

each bipod 11 and 12 has four radial lugs 21 disposed at right angles to one another and at 45° to the axis 15 of the rollers 13 carried by said bipod 11 and 12, and each lug 21 has on the surface facing the driver 8 a slot 22 designed to receive an associated end 23 of the corresponding equalizing lever 9;

the recess grooves 18 are dimensioned to avoid passing contact with the radial lugs 21 of the bipods 11 and 12 and with the equalizing levers 9;

means are provided to press the two bipods 11 and 12 continually onto the ends 23 of the equalizing levers 9, which are arranged to keep the inner surface of each bipod 11 and 12 at a distance from the cross 8 in order to avoid any contact between each bipod 11 and 12 and the cross 8.

In the embodiment shown in FIG. 2, the races 4 consist of two tracks 4a and 4b, which are plane surfaces parallel to the corresponding radial symmetry plane 5 and which are disposed opposite one another.

In this example, the rollers 13 have a bearing surface 14 with a cylindrical contour. According to one advantageous version shown on the right in FIG. 3, the bearing surface 14 can be very slightly rounded or barreled by abrasion or grinding, as diagrammed by the radius R, in order to avoid pressure points on the corners of the roller 13 or the races 4a and 4b in the event of structural deformations of the joint 1 when it is operating under torque.

Between the parallel tracks 4a or 4b of each race 4 and the bearing surface 14 of the corresponding roller 13 there is a clearance, not shown in FIG. 2 for reasons of simplification, sufficient to allow the free passage of the roller 13 between the two tracks 4a and 4b.

The longitudinal grooves 18 that extend in the direction of the axis 2a of the sleeve 2 have sufficient radial depth and transverse width to ensure, particularly in the outward radial direction, the free deflection of the radial lugs 21 that project from the moving assembly consisting of the driver 8 and the two bipods 11 and 12 integral with the inner shaft 6 for all possible configurations of the joint, that is, all the possible configurations of the inner shaft 6 in relation to the sleeve 2.

The two bipods 11 and 12 preferably are identical. They are centered radially in relation to one another by the inner shaft 6, the axis 17 of which is the common axis of the two bipods 11 and 12.

The two bipods 11 and 12 are retained in relation to one another in the direction of the axis 17 of the inner shaft 6 by four ties 24 that extend essentially in the direction of the axis 17 of said inner shaft 6 and are arranged to allow the two bipods 11 and 12 to pivot simultaneously at the same angle in the opposite directions about the axis 17 of said inner shaft 6.

Each tie 24 is arranged to articulate in relation to each bipod 11 and 12. To this end, spherical seats 25 are machined in the bipods 11 and 12 along a profile complementary to that of the spherical bearing surfaces 26 provided beneath the screw head 27 and beneath the adjusting nut 28 of each tie 24.

A clearance 29 is provided between the respective inner surfaces of the bipods 11 and 12, on the one hand, and the driver 8, on the other hand (see FIGS. 3 and 7).

To this end, the bipods 11 and 12 are kept apart from one another in the direction of the axis 17 by the ends or teeth 23 of the equalizing levers 9 engaged in the slots 22 of the bipods 11 and 12, each equalizing lever being hinged in a pivoting manner about a respective pivot shaft 20 consisting of the corresponding arm of the driver 8 that enters the central bore 30 of each equalizing lever 9.

The equalizing levers 9 thus can pivot slightly about the shafts 20. In this way, the two bipods 11 and 12 can pivot in relation to one another about the axis 17 of the inner shaft 6 and only about this axis, the two bipods 11 and 12 being maintained-forcefully and precisely parallel to one another and in the plane 16 perpendicular to the axis 17.

Figures 8, 9:
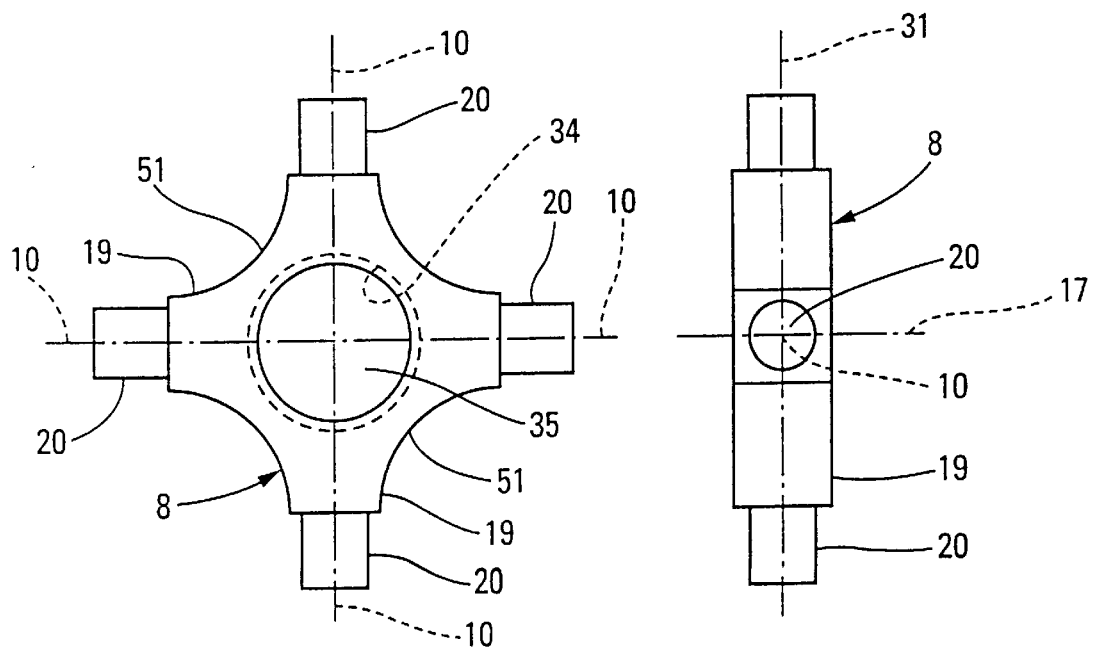
FIG. 8 is a plan view of the driver for the embodiment, shown in FIGS. 1 through 3 and 7.
FIG. 9 is a profile view of the driver of FIG. 8.

Also by design, the two bipods 11 and 12 are always kept rigorously parallel to the median plane 31 of the driver 8 (see FIG. 9).

At every moment, the two bipods 11 and 12 in relation to the driver 8 are in respective pivoted positions about the axis 17 that correspond to the same pivot angle in the opposite directions of pivoting, which thus assures the constant-velocity rotation of the driver 8 and the inner shaft 6 in relation to the sleeve 2.

Furthermore, these pivotings or oscillations occur with a minimum of mechanical losses. Thus the transmitted forces are lessened, and very little slippage is possible. In addition, the lubrication of the parts in contact with one another is excellent, because the contact pressure is lessened and the surfaces involved are all situated outside of the bipod unit consisting of the two bipods 11 and 12 and the driver 8, and thus are constantly drenched with lubricant.

Also, the cyclical complementary moments applied to each bipod 11 and 12 are added vectorially onto the driver 8, which thus transmits to the inner shaft 6 a constant complementary torque as would any constant-velocity joint.

Each bipod 11 and 12 has a central bore 32. The outer surface of the inner shaft 6 has splines 33 that pass freely within the bores 32 of the bipods 11 and 12 to provide direct radial guidance of said bipods.

The splines 33 of the inner shaft 6 engage without clearance into complementary splines 34 made along the inside of the central opening 35 of the driver 8 (see FIGS. 3 and 8).

In the embodiment shown in detail in FIGS. 4 through 6, the preferably identical bipods 11 and 12 consist of a generally square main plate 36 having a central opening 32 and carrying on two opposite sides two trunnions 37, each carrying a roller designed to turn about the corresponding trunnion 37.

The common axis 15 of the trunnions 37 and of the rollers 13 is offset axially—that is, along the axis 17 of the inner shaft 6—toward the other bipod 12 or 11 in order to provide the space necessary between the two bipods 11 and 12 for the driver 8, the median plane 31 of which in the assembled position contains the axes 15 of the four rollers 13.

The connection between each trunnion 37 and the main plate 36 of each bipod 11 and 12 is reinforced by a metal bead 38 that is easily obtained when the part is formed and that must allow the necessary space for a slight relative deflection of the driver 8 about the axis 17.

The main plate of each bipod 11 and 12 has on each radial lug 21 a slot 22 with an inside profile in the form of a hollow tooth, while the ends 23 of the equalizing levers 9 have an outside profile in the form of a tooth conjugate with the inside profile of the slots 22.

Figures 10, 11:
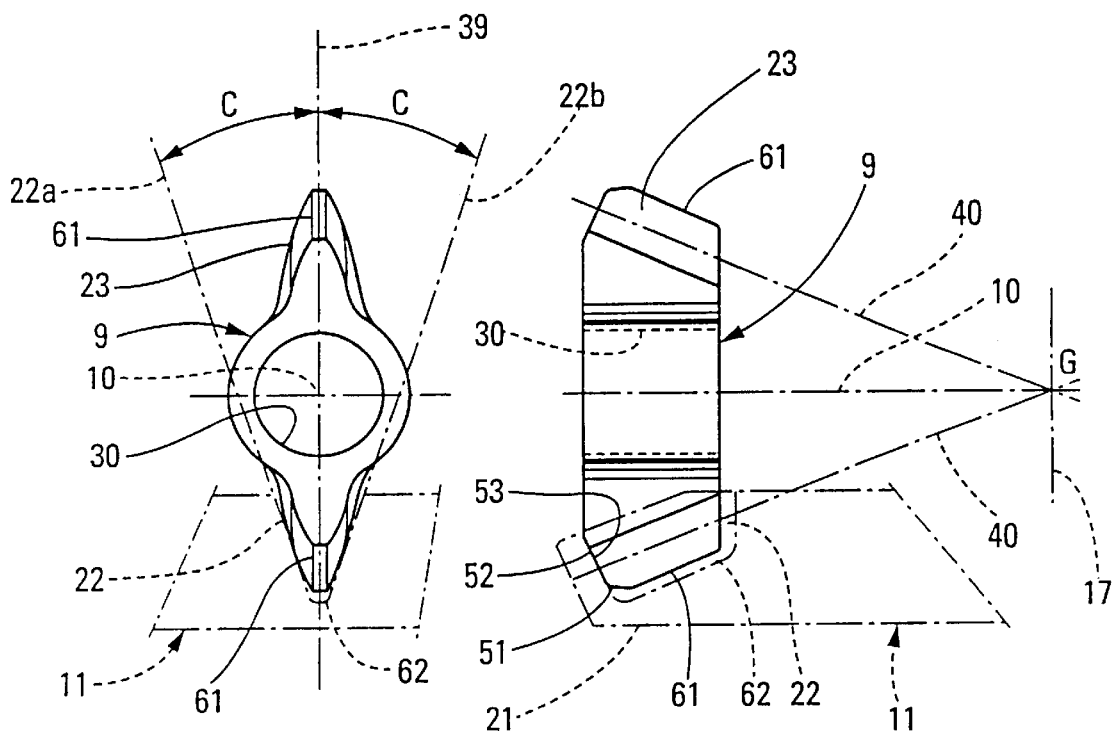
FIG. 10 is an enlarged elevation of an equalizing lever as seen,from the axis of the inner shaft, with the inner bipod diagrammed in dot-and-dash lines.
FIG. 11 is a left view of the equalizing lever of FIG. 10.

Viewed in cross section, each slot has a trapezoidal profile of constant section defined by two plane walls 22a and 22b, which make a predetermined peak half-angle of C to a radial symmetry plane 39 of said slot 22 as shown in FIG. 10.

Each slot 22 has an inclined axis 40 converging essentially to the point G of the common intersection of the axis 17 of the inner shaft 6 and of the axis 15 of the rollers 13.

In the embodiment shown in FIG. 4, the slots 22 or teeth are set in radial planes that in the plan view of FIG. 4 make an angle of 45° with the axis 15 of the rollers 13 and of the trunnions 37.

The recesses 41 reduce the thickness of the plate 36 toward the end of the slots 22. These slots 22 are made inexpensively and precisely, for example by cold forming, and advantageously serve as the precise datum for locating and driving the bipod 11 or 12 during the automatic machining and finish grinding of the trunnions 37, during the machining of the bore 32, and during other manufacturing and finishing operations.

During the cold forming of the slots 22, the die enclosing the perimeter of the workpiece automatically ensures the exact forming of the outside of the radial lugs 21, each of which has a slot 22.

As shown in FIGS. 4 and 5, the trunnions 37 advantageously have at their base a shoulder 42 which serves both to connect the trunnion 37 with the plate 36 and to hold and inwardly retain needles, which are represented by 43 in FIG. 3 and are usually interposed between the inside bore 44 of each roller 13 and the corresponding trunnion 37. In the example shown in FIG. 3, each trunnion has a central hole 45 that is preferably terminated on the outside by a milled conical shape 46 and on the inside by a small spherical or quasi-spherical machined or formed surface 47 (see FIG. 5).

In the example of FIG. 3, the roller 13 and the needles 43 are retained outwardly by a rivet or a screw 47 and a tapered nut 48 that radially retains a thrust washer 49 with a conical bearing surface 50 complementary to that of the nut 48.

The centrifugal radial forces applied to the rollers 13 and to the needles 43 at high speed can reach about 100 kgf, or about 1000 N. Because of this radial retaining device, these forces cause only small mechanical losses due to sliding.

Of course, rivets can be used instead of the screws and nuts described above, because there is very easy access to both ends of the central hole 45.

Production riveting can be done economically, rapidly, and precisely using automatic tongs that apply force simultaneously to both ends of the rivet. The force is controlled so that after release there is a sufficient clearance to ensure the free rotation of the roller 13 on the corresponding trunnion 37.

As diagrammed in FIGS. 8 and 9, the central driver 8 has the general shape of a cross and has a central opening 35, the edge of which has splines 34 complementary to the splines 33 of the inner shaft 6. The driver 8 has four recesses 51, each designed to allow the corresponding tie 24 to pass between the two adjacent arms 19 of the driver.

The two ends 23 of each equalizing lever 9 have an outside profile in the shape of a tooth conjugate with the inside profile of the slots 22. The teeth 23 are designed to engage the inside of the trapezoidal slots 22. The cross section of each tooth 23 has an involute profile of constant cross section conjugate with the peak half-angle C of each slot 22.

Each tooth 23 also has an inclined axis that essentially coincides with the axis 40 of the corresponding slot 22 and essentially converges to the same point G where the axis 17 of the inner shaft 6 intersects the common axis 15 of the two rollers 13.

As shown in FIG. 11, the top land 61 of the tooth 23 does not contact the bottom land 62 of the corresponding slot 22, so that the only contact between the equalizing lever 9 and the corresponding bipod 11 and 12 is between the involute side walls of the tooth 23 and the side walls 22a and 22b of the corresponding slot 22, as shown in FIG. 10.

In the example shown in FIG. 11, the corners of the outside ends of the teeth 23 are truncated by the curves 51 to allow the teeth 23 to bear at 52 against the end wall 53 that is the radially outward limit of the corresponding slot 22 and is designed to retain the tooth 23 of the equalizing lever 9 in said slot 22.

Because of the inclined position of the axes 40, the two bipods 11 and 12 are permanently pressed by the ties 24 against the teeth 23 of the equalizing levers 9, and the latter are in turn thrust radially outward against the corresponding end wall 53.

In the embodiment shown in FIG. 3, the retaining rings 54 and 55 are seated in grooves 56 on the outer peripheral wall of the inner shaft 6 on either side of the splines 33. The retaining rings 54 and 55 retain the assembly consisting of the two bipods 11 and 12 and the driver 8 in the axial position on the inner shaft 6. In the version shown in FIG. 13, the retaining rings 54 and 55 are situated on either side of the driver 8 against the transverse surfaces of the latter.

To this end, the inside surface of each bipod 11 and 12 has a notch 57 that provides the necessary space for the retaining rings 54 and 55.

To make the assembly shown in FIG. 7, begin by mounting the inside bipod 11 equipped with its two rollers 13 on the inner shaft 6. Then seat the inner retaining ring 54 in the groove 56 machined for that purpose on the splines 33 of the shaft 6. Then seat the cross 8 on the splines 33 of the shaft 6 and bring it to bear axially against the retaining ring 54. At the same time, the teeth 23 of the equalizing levers 9 are inserted into the corresponding slots 22 of the bipod 11.

Then seat the outer retaining ring 55 in the groove 56 provided for that purpose on the splines 33 of the shaft 6 and bring it to bear axially against the driver 8. Finally, install the second bipod 12 and secure it by the ties 24, which retain it axially and provide the prestress that eliminates the clearances.

The ties 24 impose a prestress on the bipods 11 and 12 and thus provide a slight flexure, which constitutes a sufficient elastic reserve for maintaining this prestress during the entire lifetime of the sliding constant-velocity joint and of the corresponding vehicle.

The maximum deflection angle of the equalizing lever 9 is about 9° for the maximum working angle of 25° for the joint shown in FIGS. 1 through 3.

For the continuous working angle of 15° shown in FIG. 1, the deflection of the equalizing lever 9 is only 3°.

The bipod unit shown in FIG. 7 consists of the assembly of the two bipods 11 and 12 about the driver 8 viewed in the direction of the arrow F in FIG. 2.

This FIG. 7 shows one of the four equalizing levers 9 pivoting about the corresponding arm 20 of the driver 8 and meshing with the two bipods 11 and 12.

In the position shown in FIG. 1, the inner shaft 6 meets the axis 2a of the sleeve 2 at a working angle of A =15°, which is acceptable for continuous operation. Under these conditions, the sliding constant-velocity joint according to the present invention allows an insertion L of about 90 mm for a sleeve 2 with an outside diameter of 100 mm.

For a working angle of 25°, the maximum possible insertion is 50 mm from the outer axial edge of the sleeve 2 for a sleeve having the same outside diameter of 100 mm.

This characteristic of greater angular insertion constitutes one of the important advantages of the sliding constant-velocity joint according to the invention. Thus this characteristic permits the advantageous use of the joint for applications that previously required double Cardan joints associated with sliding spline devices, said latter joints being expensive, heavy, bulky, and productive of strong axial reactions.

Obviously, the sleeve 2 can be made in different lengths depending on the desired amount of sliding. The bipod unit consisting of the two bipods 11 and 12 surrounding the driver 8 can be the same regardless of the sliding distance.

As diagrammed in FIG. 2, the effective radius "R1" of each of the four rollers 13 is an important characteristic when compared with the outside radius "R2" of the sleeve 2. The ratio R1/R2 for the example shown is about 73%, which ensures good lubrication and the maximum torque transmission for the given diametral size of the sliding constant-velocity joint.

The rollers 13 roll without drifting or lateral sliding on the tracks 4a and 4b of the corresponding race 4, which greatly reduces the friction loss, wear, and heating in comparison with joints that use spherical rollers.

The sliding constant-velocity joint according to the present invention can be bent safely at an angle of more than 60° to insert the bipod unit into the sleeve 2. This advantage of the joint is useful during assembly on the chassis.

Thus there is the same ease of assembly as provided by devices with sliding splines associated with a double Cardan joint.

The following method can be used to calculate the dimensions necessary for the longitudinal grooves to let each groove accept a respective lug 21 of each bipod and also the corresponding equalizing lever 9. As diagrammed in FIGS. 4 through 6, a reference point P of first approximation is chosen on the planes that longitudinally bisect the axes 15 of the rollers 13.

The point P determines the median symmetry plane 39 of the corresponding slot 22. It is situated at the peak of the radial lug 21.

The displacement locus of this point P during rotation of the sliding constant-velocity joint is diagrammed in FIG. 12 for a bend angle of 25°. This displacement locus is approximately elliptical. It is offset, by about a distance of between 1 and 1.5 mm for a joint with an outside diameter of 100 mm, from the axis OS toward the rollers 13 of the corresponding bipod 11 and 12.

Figure 14:
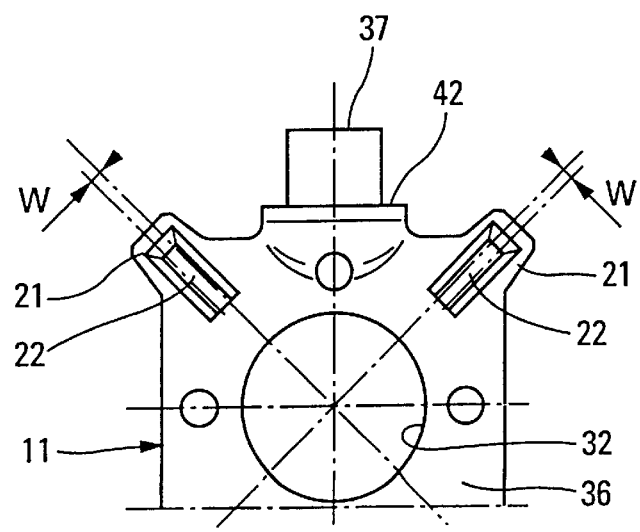
FIG. 14 is a view, similar to FIG. 4, that diagrams the optimizing correction to the position of the slots in the bipod lugs.

Thus it is very advantageous to offset the lugs 21, the plane 39, and the axis 40 of the slots 22 away from the adjacent roller by a distance W in order to equalize the distances between the displacement locus of the point P and the plane walls 22a and 22b of the corresponding slot 22 in order to increase the minimum distance between this locus and the plane walls, as diagrammed in FIG. 14.

The following calculations can be made based on FIG. 12:

When the joint is aligned, the coordinates of P in the system STOU can be expressed as a function of the distances h (FIG. 12) and m (FIG. 6) as:

$$S_{PO} = h\sqrt{2}$$

$$T_{PO} = O$$

$$U_{PO} = m$$

The coordinates of P when the joint is rotating at an angle A are:

$$\sqrt{2}\, S_P = h(\cos M + \cos N - \sin M \sin N) - m(\sin M \cos N + \sin N)$$

$$\sqrt{2}\, T_P = h(\cos M - \cos N - \sin M \sin N) - m(\sin M \cos N - \sin N)$$

The rotation M is defined as a function of the rotation N as:

$$\sin^2 M = \sin^2 A - \sin^2 N$$

According to one important characteristic of the present invention, the mean lever arm of the slots 22 in relation to the axis 17 of the inner shaft 6 is essentially equal to that of the rollers 13 of the bipods 11 and 12.

Similarly, according to another advantageous characteristic, the lever arm and the dimensions of each tooth 23 are arranged so that the contact pressure does not exceed the pressure applied to the trunnions 37 of the bipods 11 and 12 for the same transmitted torque.

Of course, the present invention is not limited to the embodiments described above and shown in the figures, and numerous changes and modifications can be made to these embodiments without going beyond the scope of the invention.

What is claimed is:

1. A sliding constant-velocity joint, particularly for longitudinal drives, comprising:
    (A) an outer member or sleeve having an inner peripheral wall with four identical longitudinal races, each comprising two tracks parallel to the axis of the sleeve, the races being open inwardly and each having a radial symmetry plane at right angles to the radial symmetry plane of the adjacent races;
    (B) an inner input shaft with a driving member mounted in the vicinity of the end of said shaft and fixed thereto, said driving member having on its periphery several equalizing levers designed so that each pivots in relation to the driver about a respective radial axis and uniformly spaced on the periphery of said driver;
    (C) two bipods mounted to pivot about the inner shaft on either side of the driver, each bipod having at each of its two opposite radial ends a respective roller having a peripheral bearing surface with a profile complementary to that of the corresponding race to allow it to roll in relation to said race, the axes of the rollers being in the same plane perpendicular to the axis of the inner shaft;
    (D) the equalizing levers being arranged so that the two bipods in relation to the driver are always in respective pivoted positions corresponding to the same pivot angle in opposite directions; characterized in that:
        (i) the inner peripheral wall of the sleeve has four longitudinal recess grooves that open inwardly and are each disposed on a diagonal between two adjacent races;
        (ii) the driver is in the form of a cross with four arms disposed radially at right angles to one another, the free end of each arm being configured to serve as the pivot shaft of a corresponding equalizing lever;
        (iii) each bipod has four radial lugs disposed at right angles to one another and at 45° to the axis of the rollers carried by said bipod, and each lug has on the surface facing the driver a slot designed to receive an associated end of the corresponding equalizing lever;
        (iv) the recess grooves are dimensioned to avoid passing contact with the radial lugs of the bipods and with the equalizing levers; and
        (v) means are provided to press the two bipods continually onto the ends of the equalizing levers, which are arranged to keep the inner surface of each bipod at a distance from the cross in order to avoid any contact between each bipod and the cross.

2. A sliding constant-velocity joint according to claim 1, characterized in that the races each consist of two plane surfaces that are parallel in the corresponding radial symmetry plane and are disposed facing one another, and in that the rollers have a bearing surface with a cylindrical contour.

3. A sliding constant-velocity joint according to claim 1, characterized in that the slots have an inside profile in the form of a hollow tooth and that the ends of the equalizing levers have an outside profile in the form of a tooth conjugate with the inside profile of the slots.

4. A sliding constant-velocity joint according to claim 3, characterized in that each slot has a trapezoidal cross sectional profile with a constant cross section limited by two plane walls that make a predetermined peak half-angle (C) in relation to a radial symmetry plane of said slot, and in that each tooth has a symmetric involute profile of constant section that is conjugate with the peak half-angle (C) of each slot.

5. A sliding constant-velocity joint according to claim 3, characterized in that each slot has an inclined axis converging essentially to the intersection point (G) between the axis of the inner shaft and the axis of the trunnions of the corresponding bipod, and in that in the assembled position of the joint each tooth has essentially the same inclined axis converging essentially at the same point.

6. A sliding constant-velocity joint according to claim 3, characterized in that each slot is limited radially outward by an end wall designed to retain each tooth of the equalizing lever in position in said slot.

7. A sliding constant-velocity joint according to claim 1, characterized in that the bipods are retained in relation to one another by ties that extend essentially in the direction of the axis of the inner shaft and are arranged to allow a simultaneous pivoting of the two bipods at the same angle in opposite directions about the axis of the inner shaft.

8. A sliding constant-velocity joint according to claim 7, characterized in that each tie is arranged to be articulated in relation to each bipod.

9. A sliding constant-velocity joint according to claim 1, characterized in that the mean lever arm of the slots in relation to the axis of the inner shaft is essentially equal to that of the rollers of the bipods.

10. A sliding constant-velocity joint according to claim 1, characterized in that the lever arm and the dimensions of each tooth are arranged so that the contact pressure does not exceed the pressure applied to the trunnions of the bipods for the same transmitted torque.

* * * * *